United States Patent
Yasuo et al.

(10) Patent No.: US 7,761,718 B2
(45) Date of Patent: Jul. 20, 2010

(54) POWER CONTROLLER, SERVER, AND POWER CONTROL METHOD

(75) Inventors: Akihiro Yasuo, Kawasaki (JP); Yoshiro Ikeda, Kawasaki (JP); Atsushi Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 11/442,986

(22) Filed: May 31, 2006

(65) Prior Publication Data

US 2007/0186120 A1     Aug. 9, 2007

(30) Foreign Application Priority Data

Feb. 7, 2006     (JP)    ............... 2006-030193

(51) Int. Cl.
    *G06F 1/00*     (2006.01)
    *G06F 1/26*     (2006.01)
    *G06F 11/30*     (2006.01)

(52) U.S. Cl. ............... 713/300; 713/320; 713/330; 713/340; 307/43; 307/46; 307/64

(58) Field of Classification Search ......... 713/300, 713/320, 330, 340; 307/43, 46, 64
See application file for complete search history.

(56) References Cited

U.S. PATENT DOCUMENTS

| 5,898,234 | A | 4/1999 | Kitagawa | |
|---|---|---|---|---|
| 6,353,894 | B1 | 3/2002 | Pione | |
| 2003/0090236 | A1 | 5/2003 | Odaohhara et al. | |
| 2003/0110403 | A1* | 6/2003 | Crutchfield et al. | ......... 713/300 |
| 2004/0053082 | A1* | 3/2004 | McCluskey et al. | ............ 429/9 |
| 2004/0113585 | A1 | 6/2004 | Stanesti et al. | |
| 2004/0263124 | A1 | 12/2004 | Wieck et al. | |
| 2005/0057224 | A1 | 3/2005 | Naitoh et al. | |
| 2006/0032076 | A1* | 2/2006 | Evanyk et al. | ................. 34/96 |
| 2006/0078773 | A1* | 4/2006 | Speranza et al. | ............. 429/23 |
| 2006/0170289 | A1* | 8/2006 | Hong et al. | ................... 307/64 |

FOREIGN PATENT DOCUMENTS

| EP | 1 494 332 | 1/2005 |
|---|---|---|
| JP | 05-015061 | 1/1993 |
| JP | 9-322431 | 12/1997 |

(Continued)

OTHER PUBLICATIONS

Extended European Search Report issued in corresponding European Patent Application No. 06252775.9, on Dec. 28, 2007.

(Continued)

*Primary Examiner*—Thomas Lee
*Assistant Examiner*—Michael J Brown
(74) *Attorney, Agent, or Firm*—Staas & Halsey LLP

(57) ABSTRACT

In a blade of a blade server, power is supplied from a power distributing unit to an internal circuit, and also supplied to a capacitor to charge the capacitor. If power consumption of the blade server is high and a process load on a blade is also high, power is supplied to the internal circuit from both the power distributing unit and the capacitor. If the process load on the blade is low, power is supplied to the internal circuit only from the power distributing unit.

7 Claims, 6 Drawing Sheets

FOREIGN PATENT DOCUMENTS

| | | |
|---|---|---|
| JP | 2001-095288 | 4/2001 |
| JP | 2001-258176 | 9/2001 |
| JP | 2005-202506 | 7/2005 |
| JP | 2005-100096 | 4/2006 |
| WO | WO 92/21081 | 11/1992 |
| WO | WO 01/22205 | 3/2001 |

OTHER PUBLICATIONS

Partial European Search Report, mailed Jun. 29, 2007 and issued in corresponding European Patent Application No. 06252775.9-2224.

Communication from the Japanese Patent Office mailed on Jul. 7, 2009 in the related Japanese application No. 2006-030193.

* cited by examiner

POWER CONTROLLER, SERVER, AND POWER CONTROL METHOD

BACKGROUND OF THE INVENTION

1. Field of the Invention

The present invention generally relates to a technology for supplying power to a process circuit. The present invention specifically relates reducing power consumption of a process circuit.

2. Description of the Related Art

Recently, enhancement of server capacity is resulting in a significant rise in power consumption of servers. Especially, so called blade servers have higher central processing unit (CPU) density than the so called rack mount servers, so that the blade servers consume higher power. Therefore, in places such as the so called Internet Data Centers (IDC's), which includes many blade servers, a power layout is carried out to ensure that sufficient power is supplied.

However, recently, increasingly high performing CPU's are used in the servers and multiple such CPU's are mounted on a single server. Sometimes the required amount of power can exceed the estimated amount of power in the original power layout. To avoid this, it becomes necessary to restrict the number of servers mounted on a rack.

Japanese Patent Laid-Open Publication No. 2005-202506 discloses controlling power consumption of CPU's in a blade server with hardware called Blade Management Controller (BMC). Specifically, the BMC causes the CPU's to operate at lower operating frequencies than their original operating frequencies. When an operating frequency of a CPU is less, it requires lower power.

However, if an operating frequency of a CPU is reduced, the processing capacity of the CPU also drops. Therefore, if the operating frequencies of CPU's in a blade server are reduced, the processing capacity of the entire blade server drops.

Generally a load on a CPU in a typical server (CPU load) fluctuates with time. The CPU load instantaneously increases when the CPU executes a spike process, and CPU load reduces when a process performed by the CPU ends. FIG. 6 is a graph of CPU load against time of a CPU in a typical server. The CPU load increases to almost 100 percent when the CPU executes a spike process at a time t.

If the spike process is executed when the operating frequency of a CPU in a blade server has been intentionally reduced to save the power consumption of the CPU, it is obvious that the spike process disadvantageously continues for a longer time than when the CPU is operating at its original operating frequency.

SUMMARY OF THE INVENTION

It is an object of the present invention to at least partially solve the problems in the conventional technology.

According to an aspect of the present invention, a power controller that controls supply of power from an external source to a process circuit includes an accumulating unit that accumulates power that is supplied from the external source; and a controller that causes, when the power of the external source is insufficient to drive the process circuit, the accumulating unit to supply accumulated power to the process circuit.

According to another aspect of the present invention, a server that includes multiple process units each including a process circuit includes an accumulating unit that accumulates, when power supplied to a process unit from among the process units is more than power that is required to operate a process circuit in that process unit, excess power that is supplied to the process unit; and a controller that causes, when the power supplied to the process unit is less than the power that is required to operate the process circuit in that process unit, the accumulating unit to supply accumulated power to the process unit.

According to still another aspect of the present invention, a power control method of controlling supply of power from an external source to a process circuit includes accumulating power that is supplied from the external source; and supplying accumulated power to the process circuit when the power of the external source is insufficient to drive the process circuit.

According to still another aspect of the present invention, a power control method realized in a server that includes multiple process units each including a process circuit includes accumulating excess power that is supplied to the process unit when power supplied to a process unit from among the process units is more than power that is required to operate a process circuit in that process unit; and supplying accumulated power to the process unit when the power supplied to the process unit is less than the power that is required to operate the process circuit in that process unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail next with reference to the accompanying drawings. Although power control pertaining to a blade server is explained in the embodiments, the present invention is not to be thus limited, and can be applied to control power supply to central processing units (CPU's) in the rack mount servers or various other devices.

Figure 1:
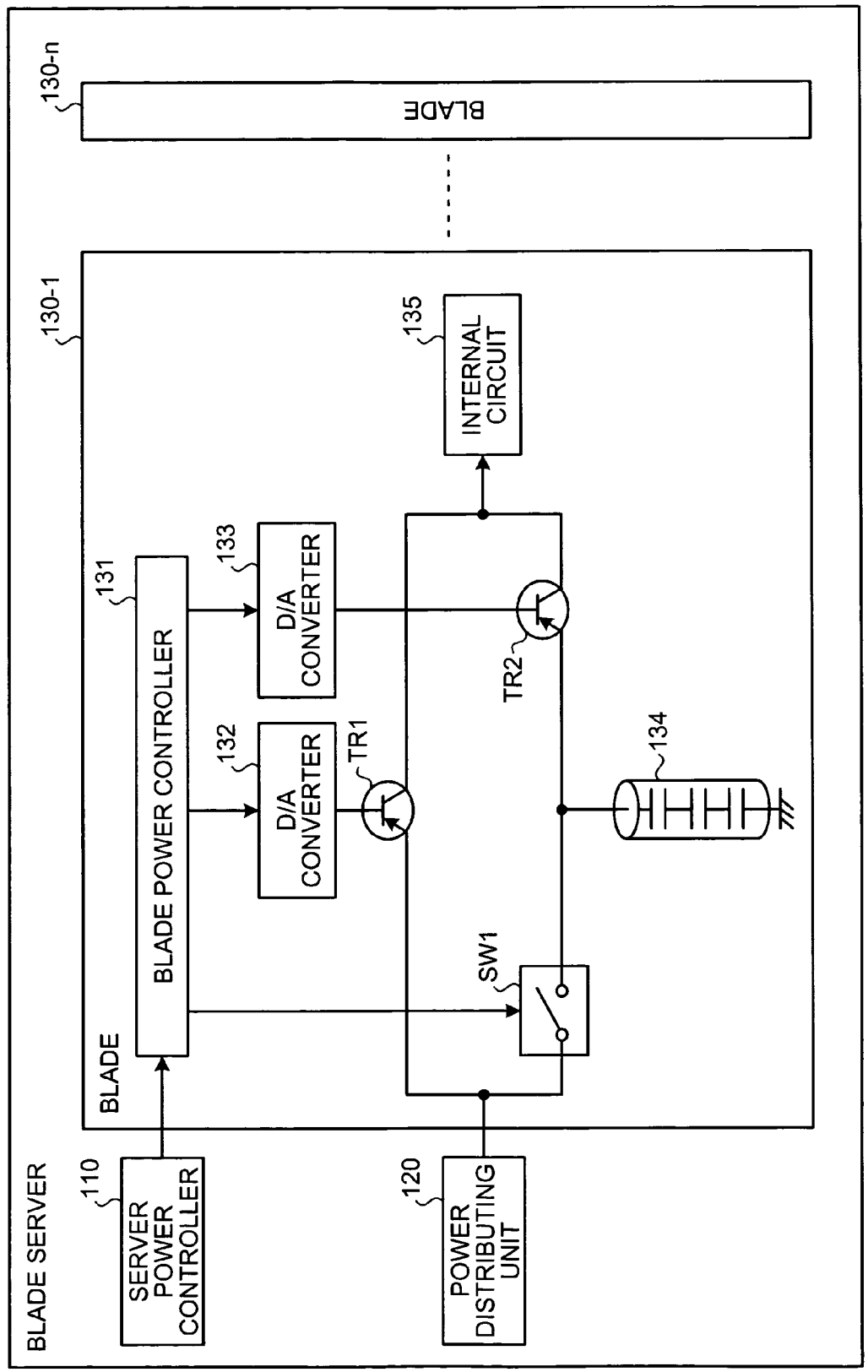
FIG. 1 is a schematic of a blade server according to a first embodiment of the present invention.

FIG. 1 is a schematic of a blade server according to a first embodiment of the present invention. The blade server includes a server power controller 110, a power distributing unit 120, and n blades 130-1 to 130-n. Only the internal structure of the blade 130-1 has been depicted in FIG. 1; because, the structures of the other blades are similar to that of the blade 130-1.

The server power controller 110 controls power consumption of the blade server. To be specific, if the power consumption of the blade server exceeds a predetermined threshold value, the server power controller 110 provides a control to restrict the power consumption of the blades having higher power consumption.

The power distributing unit 120 receives power supply from an external power source (not shown) and distributes and the power to all the blades 130-1 to 130-n.

Each of the blades 130-1 to 130-n executes a requested process while individually controlling the power received from the power distributing unit 120. Each of the blades 130-1 to 130-n includes a blade power controller 110, a digital-to-analogue (D/A) converter 132, a D/A converter 133, a high-capacitance capacitor 134, an internal circuit 135, a switch SW1, a power transistor TR1, and a power transistor TR2.

The blade power controller 110 outputs control signals to the switch SW1, the power transistor TR1, and the power transistor TR2 to control the power that is supplied to the internal circuit 135. To be specific, during a normal condition, i.e., when there is no instruction from the server power controller 110, the blade power controller 110 outputs control signals for turning ON the switch SW1 and the power transistor TR1, and turning OFF the power transistor TR2. Turning ON means that the switch or the power transistor enables flow of current, and turning OFF means that the switch or the power transistor disables flow of current. Thus, during the normal condition, the power received from the power distributing unit 120 is supplied to the internal circuit 135 via the power transistor TR1, and also to the capacitor 134 via the switch SW1 to charge the capacitor 134.

In a controlled condition, i.e., when there is a need to reduce the power consumption of the blade 130-1, the server power controller 110 detects a process load on the blade 130-1 and compares the process load with the predetermined threshold value. There can be two cases: the process load exceeds the predetermined threshold value and the process load does not exceed the predetermined threshold value.

If the process load exceeds the predetermined threshold value, the blade power controller 110 outputs control signals for turning OFF the switch SW1, and turning ON the power transistors TR1 and TR2. Thus, when the power consumption of the blade server is high and also the process load on the blade 130-1 is high, the internal circuit 135 is operated based on the power from both, the power distributing unit 120 and the capacitor 134. In this controlled condition, the capacitor 134 is discharged.

On the other hand, if the process load does not exceed the predetermined threshold value, the blade power controller 110 outputs controls signals for turning OFF the switch SW1, turning ON the power transistor TR1, and turning OFF the power transistor TR2. Thus, when the power consumption of the blade server is high and also the process load on the blade 130-1 is low, the internal circuit 135 operates on the power only from the power distributing unit 120. In this controlled condition, the capacitor 134 is neither charged nor discharged.

The blade power controller 110 outputs digital signals while the power transistor TR1 needs analog signals. The D/A converter 132 converts digital signals output by the blade power controller 110 to analog signals and supplies the analog signals to the power transistor TR1. The power transistor TR2 outputs analog signals while the blade power controller 110 needs digital signals. The D/A converter 133 converts analog signals output by the power transistor TR2 to digital signals and supplies the digital signals to the blade power controller 110.

The capacitor 134 can include multiple capacitors. The capacitor 134 is charged when the switch SW1 is ON, and discharged when the power transistor TR2 is ON. The internal circuit 135 includes one or more CPU's (not shown) that execute a requested process. When the power consumption of the blade server is high and the load on the blade 130-1 is also high, the internal circuit 135 based on power from the power distributing unit 120 and the capacitor 134 without reducing the operating frequencies of the CPU's in the internal circuit 135.

The switch SW1 opens or closes in response to the control signals from the blade power controller 110, and switches to enable or to disable charging of the capacitor 134 according to power that is supplied from the power distributing unit 120. To be specific, the switch SW1 closes when the power consumption of the entire blade server is low and there is no instruction pertaining to restriction of power consumption from the server power controller 110 to the blade power controller 110, thereby charging the capacitor 134. The switch SW1 opens when the power consumption of the entire blade server is high and the server power controller 110 issues an instruction pertaining to restriction of power consumption to the blade power controller 110, thereby terminating charging of the capacitor 134.

The power transistor TR1 controls, in response to the control signals from the blade power controller 110, power that is supplied from the power distributing unit 120 to the internal circuit 135. To be specific, when the power consumption of the entire blade server is low and there is no instruction pertaining to restriction of power consumption from the server power controller 110 to the blade power controller 110, the power transistor TR1 supplies necessary power for the process pertaining to the internal circuit 135 from the power distributing unit 120. When the power consumption of the entire blade server is high and the server power controller 110 issues an instruction pertaining to restriction of power consumption to the blade power controller 110, the power transistor TR1 supplies power equivalent to a predetermined limiting value to the internal circuit 135 from the power distributing unit 120.

The power transistor TR2 controls, in response to the control signals from the blade power controller 110, power that is supplied from the capacitor 134 to the internal circuit 135. To be specific, when the power consumption of the entire blade server is low and there is no instruction pertaining to restriction of power consumption from the server power controller 110 to the blade power controller 110, because power supply from the capacitor 134 to the internal circuit 135 is not necessary, the power transistor TR2 does not discharge the power that is accumulated on the capacitor 134. When the power consumption of the entire blade server is high and the server power controller 110 issues an instruction pertaining to restriction of power consumption to the blade power controller 110, the power transistor TR2 supplies from the capacitor 134 to the internal circuit 135 the amount of power that cannot be supplied by the power transistor TR1. In other words, when power supply from the power distributing unit 120 via the power transistor TR1 is restricted, out of the total amount of necessary power for the process pertaining to the internal circuit 135, the power transistor TR2 supplies from the capacitor 134 the amount of power that cannot be met by power supply via the power transistor TR1. Thus, if the process load of the internal circuit 135 is high, the power transistor TR2 is turned ON. If the process load on the internal circuit 135 is low, the power transistor TR2 is turned OFF.

Figure 2:
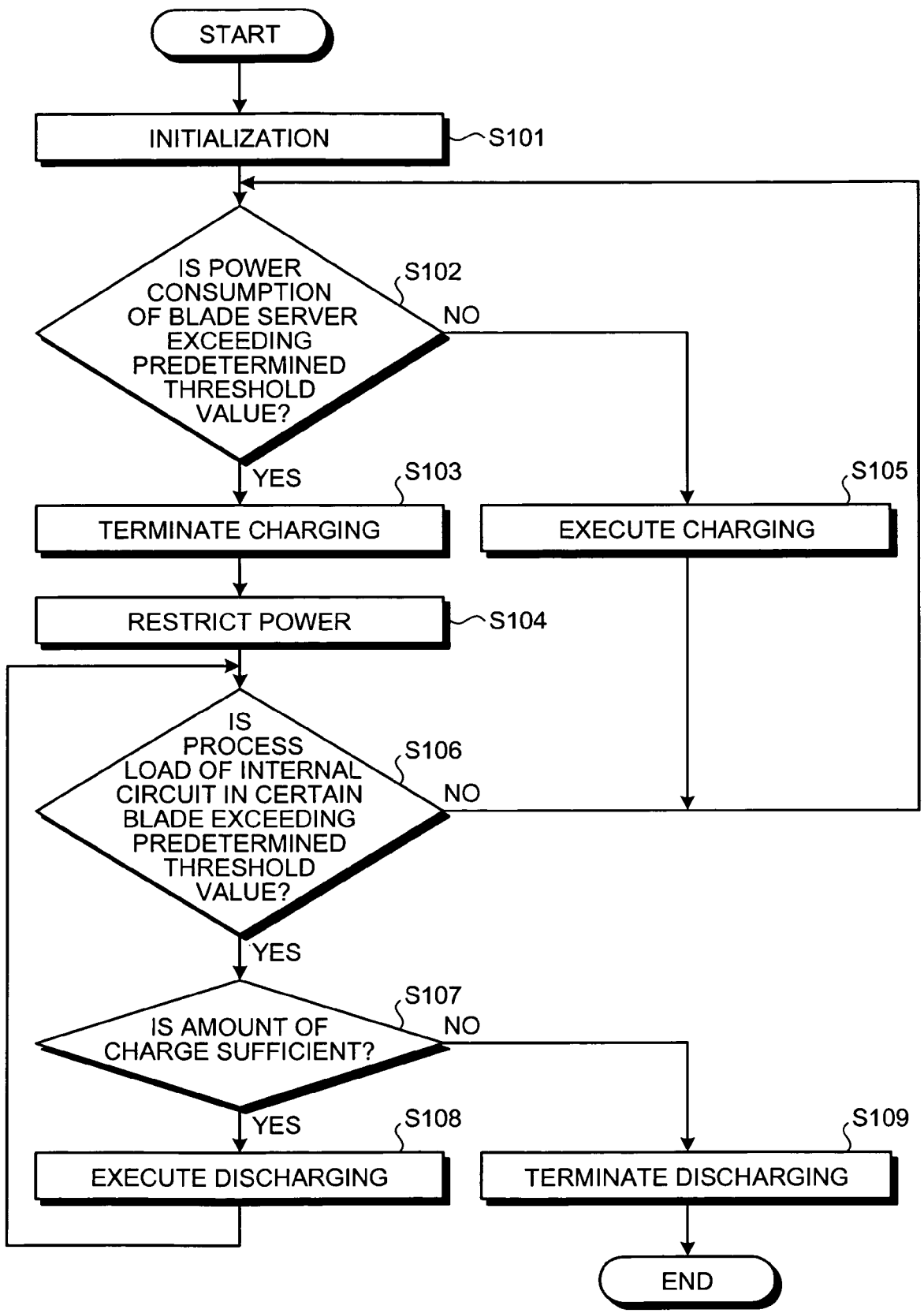
FIG. 2 is a flowchart of a power control operation performed by the blade server shown in FIG. 1.

Power control pertaining to the blade server having the aforementioned structure is explained next with reference to a flow chart shown in FIG. 2.

First, the blade power controller 110 outputs control signals, thereby initializing ON or OFF of the switch SW1, the power transistor TR1, and the power transistor TR2 (step S101). In the initial condition, power is supplied to the internal circuit 135 only from the power distributing unit 120 and charging and discharging pertaining to the capacitor 134 is not carried out. Thus, the switch SW1 is opened and turned OFF, the power transistor TR1 is turned ON, thereby supplying necessary power for the process pertaining to the internal circuit 135, and the power transistor TR2 is turned OFF, thereby disabling the power supply to the internal circuit 135 from the capacitor 134.

In the initial condition, the server power controller 110 monitors the power consumption pertaining to the entire blade server, and determines whether the power consumption pertaining to the entire blade server is exceeding the predetermined threshold value (step S102). If the power consumption pertaining to the entire blade server is less the predetermined threshold value ("No" at step S102), because there is no instruction pertaining to restriction of power consumption from the server power controller 110 to the blade power controller 110, the blade power controller 110 determines that the amount of power supplied to the blade 130-1 is sufficient and executes charging of the capacitor 134 by using the excess power that is supplied to the blade 130-1 from the power distributing unit 120 (step S105). In other words, based on the control signals from the blade power controller 110, from the initial condition the switch SW1 is closed and turned ON, thereby enabling power supply from the power distributing unit 120 to the internal circuit 135 via the power transistor TR1, and also enabling power supply from the power distributing unit 120 to the capacitor 134. Charging of the capacitor 134 is carried out until the power consumption of the entire blade server, based on a determination result at step S102, exceeds the predetermined threshold value.

Based on the determination result at step S102, if the power consumption of the entire blade server exceeds the predetermined ("Yes" at step S102), the server power controller 110 issues an instruction pertaining to restriction of power consumption to the blade power controller 110, the blade power controller 110 determines that power supply to the blade 130-1 is not sufficient, and terminates charging of the capacitor 134 (step S103). In other words, based on the control signals from the blade power controller 110, the switch SW1 is opened and turned OFF, thereby disabling power supply from the power distributing unit 120 to the capacitor 134.

Simultaneously, based on the control signals from the blade power controller 110, power supply from to the internal circuit 135 via the power transistor TR1 is restricted to the predetermined limiting value to restrict the power consumption pertaining to the blade 130-1 (step S104). Next, the blade power controller 110 determines whether the process load pertaining to the internal circuit 135 is exceeding the predetermined threshold value (step S106). The threshold value of the process load is equivalent to the load that enables to execute the process by using the power that is supplied via the power transistor TR1 and that is equal to the predetermined limiting value. In other words, the blade power controller 110 determines whether the restricted power supply via the power transistor TR1 is sufficient for the process load pertaining to the internal circuit 135.

If the process load is less than the predetermined threshold value ("No" at step S106), the blade power controller 110 determines that power supply in addition to the power supply via the power transistor TR1 is unnecessary, and executes the process pertaining to the internal circuit 135 by using only the power supply via the power transistor TR1. The aforementioned string of process is repeated until the process load pertaining to the blade, based on the determination result at step S106, exceeds the threshold value.

Based on the determination result at step S106, if the process load pertaining to the blade exceeds the threshold value ("Yes" at step S106), the blade power controller 110 determines that power supply to the internal circuit 135 is not sufficient, and determines whether the amount of charge on the capacitor 134 is sufficient to supplement the deficit pertaining to the power supply (step S107).

The amount of charge on the capacitor 134 is explained next. Normally, because the capacitor 134 cannot be charged with infinite amount of power, a process that is being executed in the internal circuit 135 cannot be continued even after supplying the deficit of power by the power supply from the capacitor 134. To overcome the aforementioned drawback, the process pertaining to the internal circuit 135 is continued by using only the power supply from the power distributing unit 120 when the amount of charge on the capacitor 134 reduces, or a node migration is executed to move the process to another blade server having a low process load.

When executing the node migration, power that is necessary for executing the node migration needs to be maintained on the capacitor 134. Similarly, when guaranteeing continued operation during erroneous removal of the blade 130-1 by using power that is charged on the capacitor 134, the necessary power during a guarantee period also needs to be maintained on the capacitor 134. Due to this, the blade power controller 110 monitors the amount of charge on the capacitor 134, and determines whether the amount of charge is sufficient to supply power to the internal circuit 135 in addition to the amount of charge that is necessary during the node migration or continued operation during erroneous removal of the blade 130-1.

Based on the determination result at step S107, if the amount of charge on the capacitor 134 is sufficient to supplement the deficit pertaining to the power supply ("Yes" at step S107), the blade power controller 110 outputs control signals to turn ON the power transistor TR2, thereby executing discharging from the capacitor 134 (step S108). The amount of power which is supplied to the internal circuit 135 via the power transistor TR2 is equivalent to the amount obtained by subtracting the amount of power that is supplied from the power distributing unit 120 via the power transistor TR1 from the total amount of necessary power for the process load pertaining to the internal circuit 135. Due to this, even if the power supply via the power transistor TR1 is restricted to the predetermined limiting value, the power supplementing the deficit is supplied to the internal circuit 135 from the capacitor 134 via the power transistor TR2, thereby enabling the internal circuit 135 to continue the process without reducing the operating frequency of the CPU. Discharging from the capacitor 134 continues until the process load pertaining to the internal circuit 135 is high and the amount of charge on the capacitor 134 is sufficient.

Based on the determination result at step S107, if the amount of charge on the capacitor 134 is not sufficient to supplement the deficit pertaining to the power supply ("No" at step S107), in other words, if the amount of charge on the capacitor 134 is sufficient only for the node migration or continued operation during erroneous removal of the blade 130-1, the blade power controller 110 outputs control signals to turn OFF the power transistor TR2, thereby terminating discharging from the capacitor 134 (step S109). Next, the blade power controller 110 either carries out the node migration to move the process pertaining to the internal circuit 135 to another blade server, or reduces the operating frequency pertaining to the CPU of the internal circuit 135, thereby continuing the process by using only the power supply via the power transistor TR1.

According to the first embodiment, when the power consumption of the entire blade server is low, excess power is used to charge a capacitor inside a blade. When the power consumption of the entire blade server becomes high and power supply to the blade is restricted, a power transistor connected to the capacitor is used to supply power from the capacitor to supplement the deficit pertaining to the power supply from the power distributing unit. Thus, regardless of the restriction pertaining to power supply from the power distributing unit, necessary power for a process is supplied to an internal circuit of the blade, thereby removing the necessity of reducing the operating frequency of the CPU. Thus, capacity of the CPU is maintained for a short time period even if power supply is restricted, thereby enabling to reduce the processing time.

According to a salient feature of a second embodiment of the present invention, power supply from the power distributing unit and discharging of the capacitor are controlled by a switch, thereby simplifying the circuit structure.

Figure 3:
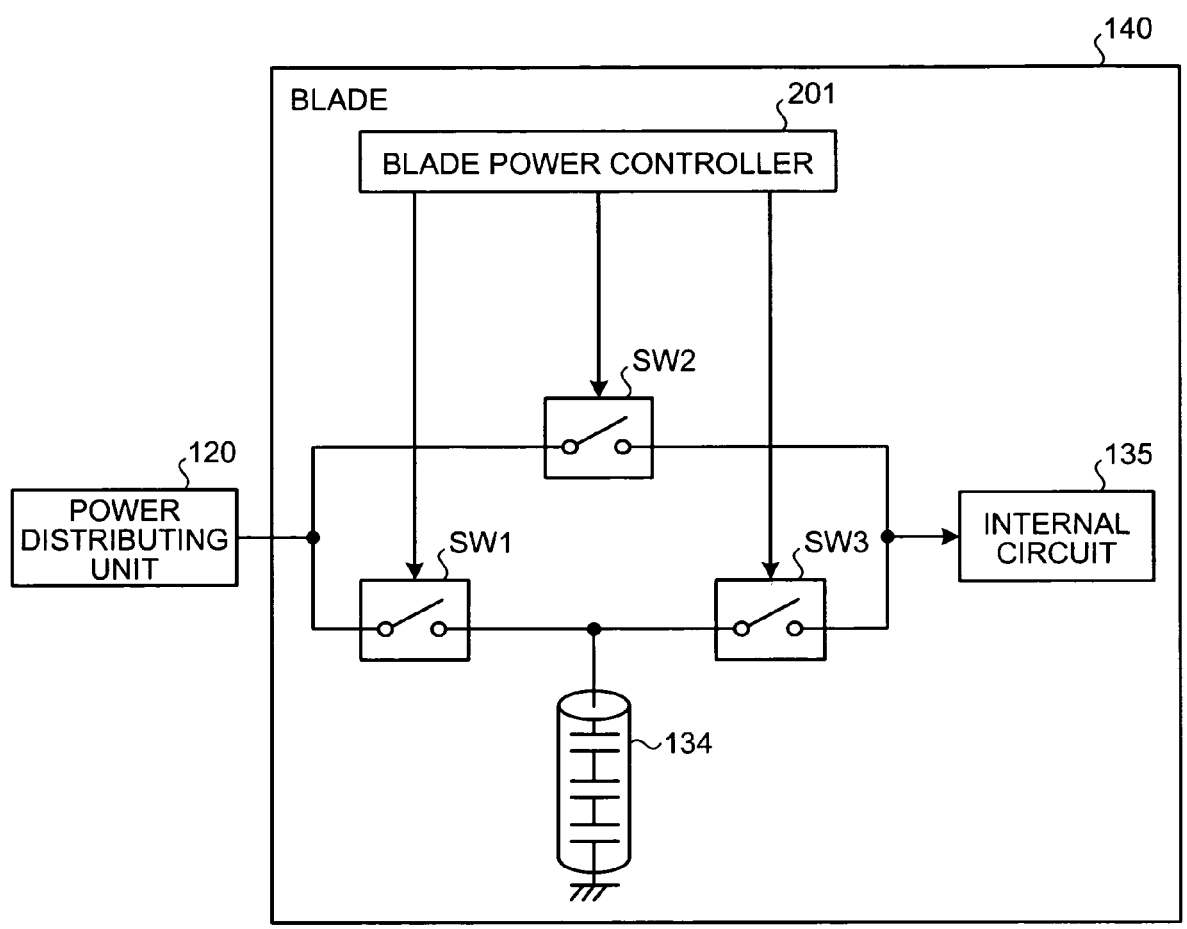
FIG. 3 is a schematic of a blade according to a second embodiment of the present invention.

Because a structure of the entire blade server according to the second embodiment is similar to the structure of the blade server according to the first embodiment (FIG. 1), an explanation of the structure is omitted. However, an internal structure of a blade in the second embodiment differs from that according to the first embodiment. FIG. 3 is a schematic of an internal structure of a blade 140 according to the second embodiment. The blade 140 can be used in place of the blades 130-1 to 130-n in FIG. 1. The components shown in FIG. 3 that are the same as the components shown in FIG. 1 are indicated by the same reference numerals and an explanation thereof is omitted. The blade 140 includes a blade power controller 201, the capacitor 134, the internal circuit 135, the switch SW1, the switch SW2, and a switch SW3.

The blade power controller 201 outputs control signals to the switch SW1, the switch SW2, and the switch SW3, thereby controlling power supply to the internal circuit 135. To be specific, during a normal condition when there is no instruction from the server power controller 110, the blade power controller 201 outputs the control signals for turning ON the switch SW1 and the switch SW2, and turning OFF the switch SW3. Thus, during the normal condition, the power distributing unit 120 supplies power to the internal circuit 135 via the switch SW2, and charges the capacitor 134 via the switch SW1.

When there is an instruction from the server power controller 110 to restrict the power consumption, the blade power controller 201 detects the process load of the blade and compares the process load with the predetermined threshold value. If the process load exceeds the predetermined threshold value, the blade power controller 201 outputs control signals for turning OFF the switch SW1, and turning ON the switch SW2 and the switch SW3. Thus, when the power consumption of the entire blade server is high and the process load pertaining to the blade is high, the power distributing unit 120 supplies power to the internal circuit 135 via the switch SW2 and the capacitor 134 supplies power to the internal circuit 135 via the switch SW3. The power distributing unit 120 does not charge the capacitor 134 via the switch SW1.

If there is an instruction from the server power controller 110 to restrict the power consumption but the process load is less than the predetermined threshold value, the blade power controller 201 outputs controls signals for turning OFF the switch SW1, turning ON the switch SW2 and turning OFF the switch SW3. Thus, when the power consumption of the entire blade server is high and the process load pertaining to the blade is low, power is supplied to the internal circuit 135 only from the power distributing unit 120 via the switch SW2. The capacitor 134 does not supply power to the internal circuit 135 via the switch SW3, and the power distributing unit 120 does not charge the capacitor 134 via the switch SW1.

The switch SW2 opens and closes, in response to the control signals from the blade power controller 201, thereby switching to enable or to disable power supply from the power distributing unit 120 to the internal circuit 135. To be specific, when the power consumption of the entire blade server is low and there is no instruction pertaining to restriction of power consumption from the server power controller 110 to the blade power controller 201, the switch SW2 closes, thereby supplying necessary power for the process pertaining to the internal circuit 135 from the power distributing unit 120. When the power consumption of the entire blade server is high and the server power controller 110 issues an instruction pertaining to restriction of power consumption to the blade power controller 201, the switch SW2 opens and closes repeatedly, thereby restricting the power that is supplied from the power distributing unit 120 to the internal circuit 135 per unit time to the predetermined limiting value.

The switch SW3 opens and closes, in response to the control signals from the blade power controller 201, thereby switching to enable or to disable power supply from the capacitor 134 to the internal circuit 135. To be specific, when the power consumption of the entire blade server is low and there is no instruction pertaining to restriction of power consumption from the server power controller 110 to the blade power controller 201, the switch SW3 opens, thereby not discharging the power that is accumulated on the capacitor 134. When the power consumption of the entire blade server is high and the server power controller 110 issues an instruction pertaining to restriction of power consumption to the blade power controller 201, the switch SW3 opens and closes complimenting the opening and the closing of the switch SW2, thereby supplying power to the internal circuit 135 from the capacitor 134 only during the timing when power is not being supplied from the power distributing unit 120. When supplying power, the switch SW3 changes frequency pertaining to opening and closing such that out of the total amount of necessary power per unit time for the process pertaining to the internal circuit 135, the switch SW3 supplies from the capacitor 134 the amount of power that cannot be met by power supply via the switch SW2. Thus, if the process load of the internal circuit 135 is high, the switch SW3 is turned to ON during the timing when the switch SW2 is turned OFF. If the process load of the internal circuit 135 is low, the frequency of the switch SW3 turning ON is reduced even during the timing when the switch SW2 is turned OFF.

In the second embodiment, a power supply ratio pertaining to the power that is supplied from the power distributing unit 120 and the power that is supplied from the capacitor 134 is changed by regulating a time ratio pertaining to opening and closing of the switch SW2 and the switch SW3. Although an instantaneous value of the power supply from the power distributing unit 120 during the timing when the switch SW2 is turned ON is equal to the value of the power supply from the power distributing unit 120 when the power consumption is not restricted, the time ratio of the timings when the switch SW2 is turned ON and OFF is regulated, thereby enabling to restrict the power supply from the power distributing unit 120 per unit time to the predetermined limiting value.

Figure 4:
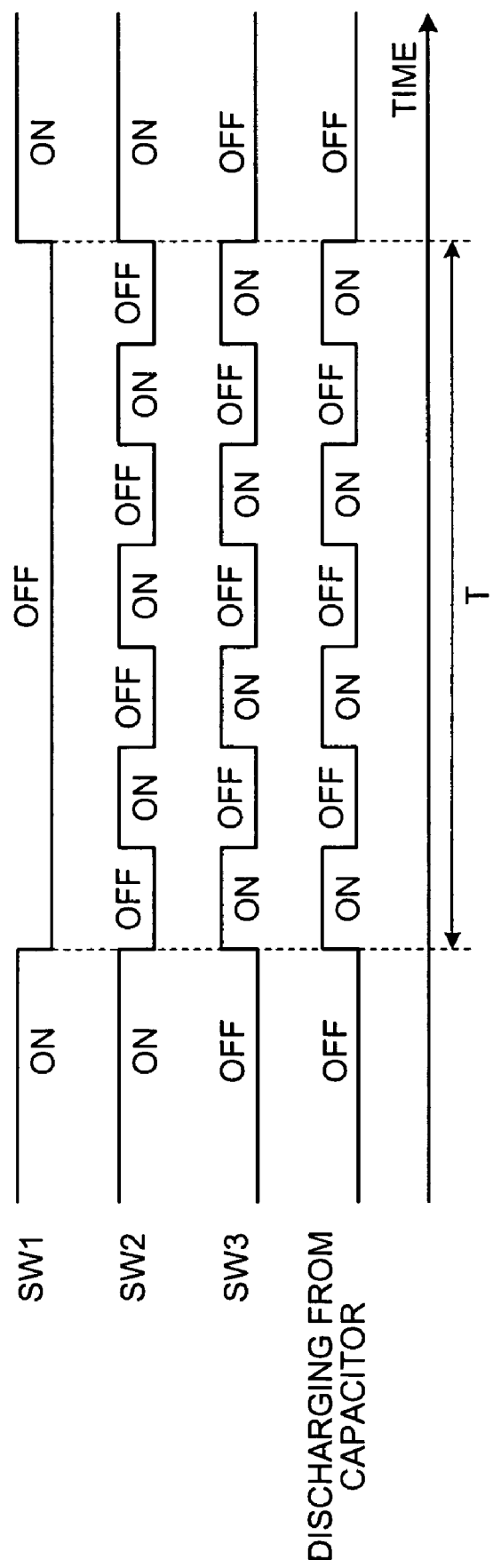
FIG. 4 is a time chart for explaining opening and closing of switches in the second embodiment.

In other words, as shown in FIG. 4, during a time interval T, because the power consumption of the entire blade server is high, the switch SW1 is turned OFF, thereby terminating charging of the capacitor 134, and the switch SW2 is repeatedly turned ON and OFF. Due to this, the power supply from the power distributing unit 120 to the internal circuit 135 during the time interval T is restricted. Thus, regulating the time ratio pertaining to opening and closing of the switch SW2 enables to restrict the power supply from the power distributing unit 120 to the internal circuit 135 during the time interval T to the predetermined limiting value.

Further, delaying the timing when the switch SW2 is turned ON for each blade enables to restrict the instantaneous value of the power supply from the power distributing unit 120 to the entire blade server.

As shown in FIG. 4, the switch SW3 is turned OFF when the switch SW2 is ON, and the switch SW3 is turned ON when the switch SW2 is OFF. Discharging of the capacitor 134 is also repeatedly turned ON and OFF when the switch SW3 is turned ON and OFF respectively. Due to this, even during the timing when the switch SW2 is turned OFF and power is not supplied from the power distributing unit 120, power is supplied to the internal circuit 135 from the capacitor 134, thereby enabling the internal circuit 135 to continue the process without reducing the operating frequency of the CPU. As shown in FIG. 4, although the switch SW3 is always turned ON during the timing when the switch SW2 is turned OFF, both the switch SW2 and the switch SW3 can be turned OFF when the process load of the internal circuit 135 is low.

In the second embodiment, instead of using power transistors that result in a complex circuit structure, by regulating the timings when switches are turned ON and OFF, power supply from the power distributing unit is restricted and deficit pertaining to power supply is supplemented by power supply from the capacitor. Thus, regardless of restriction pertaining to the power supply from the power distributing unit, necessary power for the process can be supplied to the internal circuit by using a simple circuit structure.

According to a salient feature of a third embodiment of the present invention, a constant potential circuit is connected to the capacitor in a blade, thereby simplifying a timing regulation pertaining to discharging from the capacitor.

Figure 5:
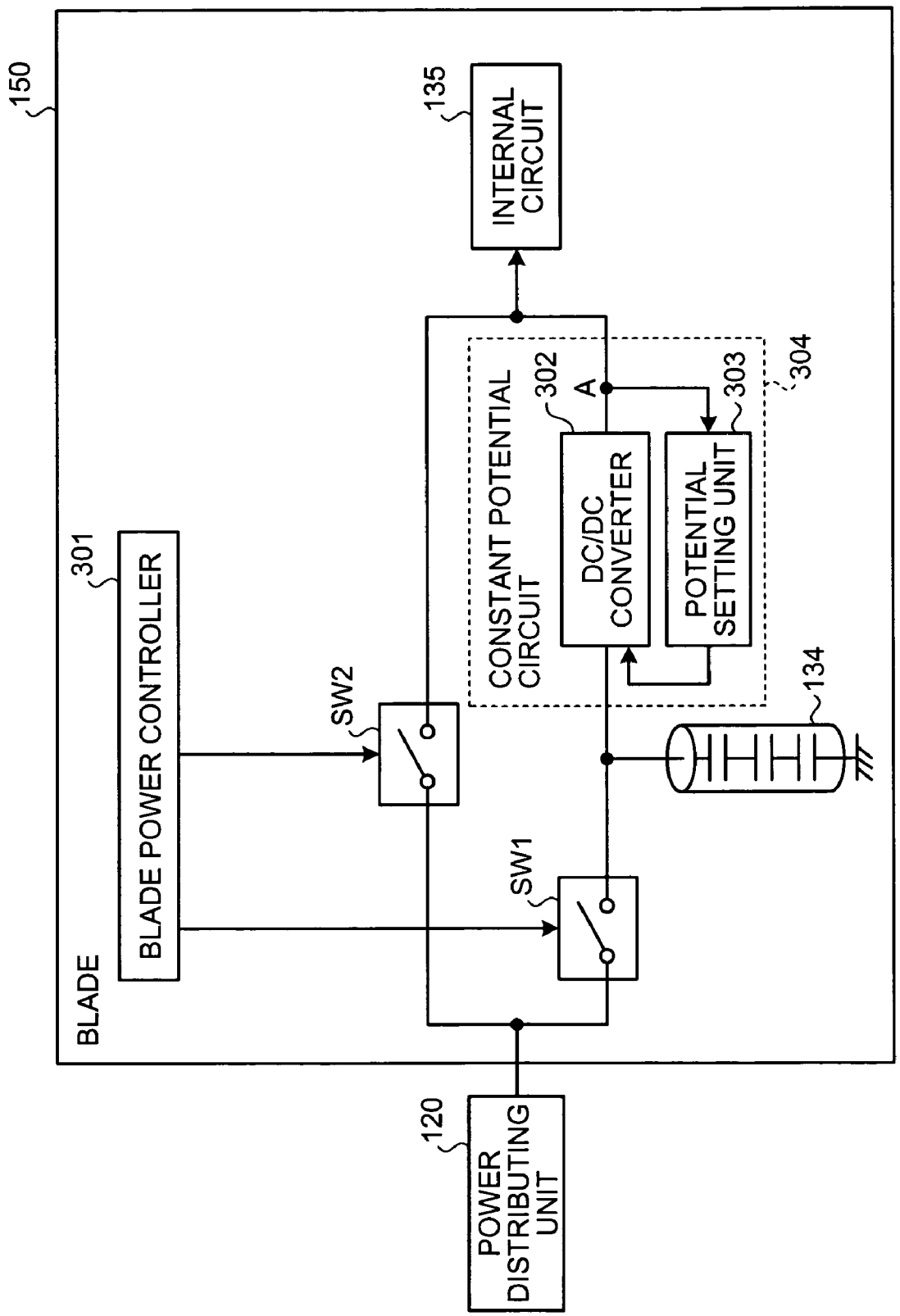
FIG. 5 is a schematic of a blade according to a third embodiment of the present invention.
Figure 6:
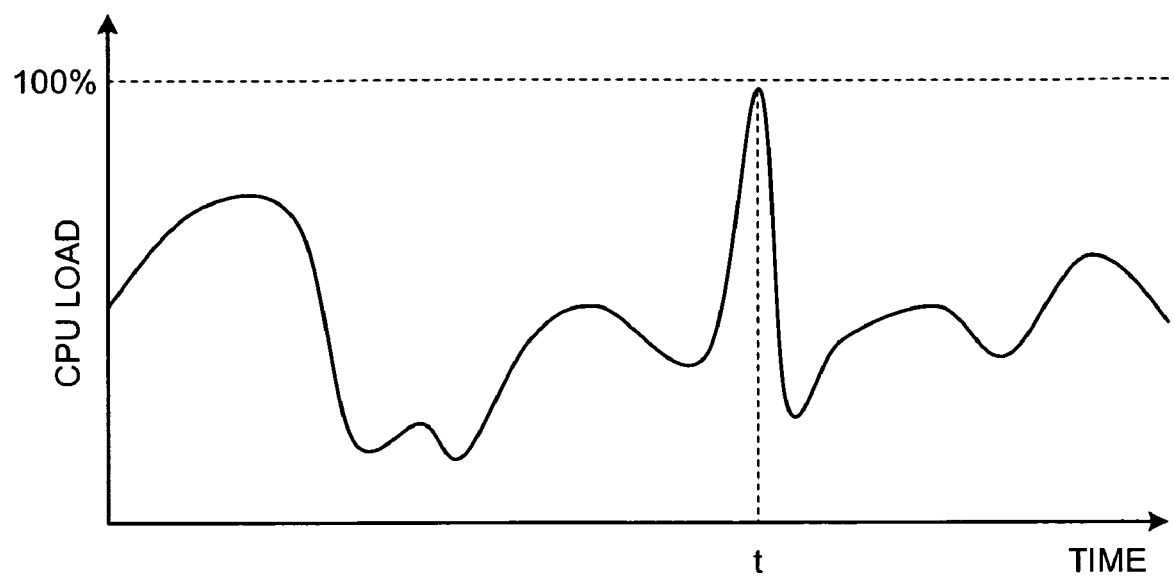
FIG. 6 is a graph of CPU load against time in a typical CPU.

Because a structure of the entire blade server according to the third embodiment is similar to the structure of the blade server according to the first embodiment (FIG. 1), an explanation of the structure is omitted. However, an internal structure of the blade in the third embodiment differs from the internal structure according to the first embodiment. FIG. 5 is a schematic pertaining to the internal structure of the blade 150 according to the present embodiment. The blade 150 can be used in place of the blades 130-1 to 130-n in FIG. 1. The components shown in FIG. 5 that are the same as the components shown in FIG. 1 are indicated by the same reference numerals, and the detailed explanation thereof is omitted. The blade 150 includes a controller 301, the capacitor 134, the internal circuit 135, the switch SW1, the switch SW2, a direct-current to direct-current (DC/DC) converter 302, and a potential setting unit 303. The DC/DC converter 302 and the potential setting unit 303 form a constant potential circuit 304.

The controller 301 outputs control signals to the switch SW1 and the switch SW2, thereby controlling power supply to the internal circuit 135. To be specific, during a normal condition when there is no instruction from the server power controller 110, the controller 301 outputs the control signals for turning ON both the switch SW1 and the switch SW2. Thus, during the normal condition, the power distributing unit 120 supplies power to the internal circuit 135 via the switch SW2, and charges the capacitor 134 via the switch SW1.

When there is an instruction from the server power controller 110 to restrict the power consumption, the controller 301 outputs control signals for turning OFF the switch SW1, and turning ON the switch SW2. Thus, when the power consumption of the entire blade server is high, the power received from the power distributing unit 120 is supplied to the internal circuit 135. The power distributing unit 120 does not charge the capacitor 134 via the switch SW1.

According to an instruction from the potential setting unit 303, if potential at a point A shown in FIG. 5 is reduced, the DC/DC converter 302 distributes power to maintain the potential at the point A to a constant value, thereby supplying power from the capacitor 134 to the internal circuit 135.

The potential setting unit 303 is prior set to a predetermined potential. The potential setting unit 303 compares the set potential with the potential at the point A, and if the potential at the point A is less, instructs the DC/DC converter 302 to distribute power. The potential set in the potential setting unit 303 is marginally less than a typical potential at the point A when the switch SW2 is turned ON.

In the third embodiment, the power supply from the power distributing unit 120 is restricted by regulating the time ratio pertaining to opening and closing of the switch SW2 similarly as in the second embodiment. Further, in the third embodiment, regardless of opening and closing of the switch SW2, the potential at the point A shown in FIG. 5 is maintained at a constant value by using the constant potential circuit 304, thereby controlling the power supply from the capacitor 134 to the internal circuit 135.

In other words, during normal condition when the power consumption of the entire blade server is low, or during the timing when the power consumption of the entire blade server is high but the switch SW2 is turned ON, because the potential at the point A shown in FIG. 5 is greater than the set potential pertaining to the potential setting unit 303, the DC/DC converter 302 does not distribute power and discharging from the capacitor is not carried out. Thus, power is supplied to the internal circuit 135 only from the power distributing unit 120 via the switch SW2.

During the timing when the power consumption of the entire blade server is high and the switch SW2 is turned OFF for restricting the power supply from the power distributing unit 120, the potential at the point A shown in FIG. 5 reduces and becomes less than the set potential pertaining to the potential setting unit 303. Due to this, the potential setting unit 303 issues an instruction to the DC/DC converter 302 pertaining to power distribution, and the DC/DC converter 302 supplies the power accumulated on the capacitor 134 to the internal circuit 135, thereby causing the potential at the point A to become nearly equal to the potential when the switch SW2 is turned ON.

According to the third embodiment, a constant potential circuit is included between the capacitor and the internal circuit. Discharging from the capacitor is not carried out during the timing when power is supplied from the power distributing unit. When the power supply from the power distributing unit stops, thereby reducing the potential pertaining to the internal circuit, discharging from the capacitor is carried out to constantly maintain the potential. Thus, simply enabling or disabling the power supply from the power distributing unit by turning ON or OFF the switches automatically controls discharging from the capacitor, thereby removing the necessity to regulate the timings pertaining to the power supply from the power distributing unit and the power supply from the capacitor.

A high capacity capacitor has been provided in each blade in the first to the third embodiments. However, a high capacity capacitor can be included only in a specific blade, and the capacitor included in the specific blade can be shared among the other blades, thereby enabling to reduce the scale of the circuit and enabling to use already existing blades for power control according to the present invention.

When inserting a new blade in the already operating blade server, because a CPU inside the new blade can be controlled only after power supply to the new blade is enabled, an operating system (OS) of the new blade is activated, and power control according to the embodiments is carried out. Thus, charging of the capacitor 134 in all the blades should be disabled by turning OFF the switch SW1 until power control pertaining to the new blade is enabled.

According to the power controller that is explained in the first to the third embodiments, power supply from the power distributing unit to all the blades is restricted when the power consumption of the entire blade server is high. However, the present invention is not to be thus limited, and can be similarly applied to power supply to the same system that is distributed to multiple rack mount servers. In other words, when the power consumption of the entire system is high and power supply to each of the rack mount servers in the system is restricted to a predetermined value, power equivalent to the deficit can be supplied from the capacitor that is included in each rack mount server.

According to an aspect of the present invention, power consumption of CPU's in an internal circuit of a blade of a blade server can be reduced without reducing the operation frequencies of the CPU's.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power controller that controls supply of power from an external source to a process circuit, the power controller comprising:
    an accumulating unit that accumulates power that is supplied from the external source; and
    a controller that causes, when the power of the external source is insufficient to drive the process circuit, the accumulating unit to supply accumulated power to the process circuit, wherein the controller includes:
        a switching unit that is connected to the external source and the process circuit and switches to enable or to disable the power supply from the external source to the process circuit; and
        a constant potential circuit that is connected to the accumulating unit and the process circuit such that the constant potential circuit fixedly maintains, regardless of whether the switching unit switches to enable or to disable the power supply, a potential necessary for the process circuit, and
    wherein the constant potential circuit includes:
        a comparing unit that compares, when only the power from the external source is being supplied to the process circuit, a threshold value, which is substantially same as a potential necessary to operate the process circuit, with an actual potential of the process circuit; and
        a power distribution controller that distributes, upon a result of comparison by the comparing unit indicating that the actual potential is greater than the threshold value, power from the accumulating unit to the process circuit.

2. The power controller according to claim 1, wherein the accumulating unit accumulates power from the external source when power supply from the external source to the process circuit is sufficient.

3. The power controller according to claim 2, wherein the accumulating unit includes
    a capacitor that is charged when supplied with power; and
    a switch element that switches to enable or to disable power supply from the external source to the capacitor.

4. The power controller according to claim 1, wherein the controller monitors a remaining power in the accumulating unit and supplies, when the remaining power is greater than a predetermined threshold value, the accumulated power to the process circuit.

5. A server that includes multiple process units each including a process circuit, the server comprising:
    an accumulating unit that accumulates, when power supplied from an external source to a process unit from among the process units is more than power that is required to operate a process circuit in that process unit, excess power that is supplied to the process unit; and
    a controller that causes, when the power supplied to the process unit is less than the power that is required to operate the process circuit in that process unit, the accumulating unit to supply accumulated power to the process unit, wherein the controller includes:
        a switching unit that is connected to the external source and each of the process circuits and switches to enable or to disable the power supply from the external source to each of the process circuits; and
        a constant potential circuit that is connected to the accumulating unit and each of the process circuits such that the constant potential circuit fixedly maintains, regardless of whether the switching unit switches to enable or to disable the power supply, a potential necessary for each of the process circuits, and
    wherein the constant potential circuit includes:
        a comparing unit that compares, when only the power from the external source is being supplied to the process circuit, a threshold value, which is substantially same as a potential necessary to operate the process circuit, with an actual potential of the process circuit; and
        a power distribution controller that distributes, upon a result of comparison by the comparing unit indicating that the actual potential is greater than the threshold value, power from the accumulating unit to the process circuit.

6. A power control method of controlling supply of power from an external source to a process circuit, the power control method comprising:
    accumulating power that is supplied from the external source;
    switching to enable or to disable the power supply from the external source to the process circuit; and
    maintaining a potential necessary for the process circuit by using the accumulated power, regardless of whether the power supply is enabled or disabled, to supply the accumulated power to the process circuit when the power supply is disabled, wherein the maintaining includes:
    comparing, when only the power from the external source is being supplied to the process circuit, a threshold value, which is substantially same as a potential necessary to operate the process circuit, with an actual potential of the process of the process circuit; and
    distributing, upon a result of comparison in the comparing indicating that the actual potential is greater than the threshold value, accumulated power to the process circuit.

7. A power control method realized in a server that includes multiple process units each including a process circuit, the power control method comprising:

accumulating excess power that is supplied to the process unit when power supplied from an external source to a process unit from among the process units is more than power that is required to operate a process circuit in that process unit;

switching to enable or to disable the power supply from the external source to the process circuit; and maintaining a potential necessary for the process circuit by using the accumulated power, regardless of whether the power supply is enabled or disabled, to supply the accumulated power to the process unit when the power supply is disabled, wherein the maintaining includes:

comparing, when only the power from the external source is being supplied to the process circuit, a threshold value, which is substantially same as a potential necessary to operate the process circuit, with an actual potential of the process of the process circuit; and distributing, upon a result of comparison in the comparing indicating that the actual potential is greater than the threshold value, accumulated power to the process circuit.

* * * * *